US012736332B2

(12) United States Patent
Song

(10) Patent No.: US 12,736,332 B2
(45) Date of Patent: Sep. 15, 2026

(54) PRECISION STRUCTURED-LIGHT SCANNER

(71) Applicant: CLAROPTIC CO., Ltd., Seongnam-si (KR)

(72) Inventor: Min-kyu Song, Seoul (KR)

(73) Assignee: CLAROPTIC CO., Ltd., Seongnam-si (KR)

( * ) Notice: Subject to any disclaimer, the term of this patent is extended or adjusted under 35 U.S.C. 154(b) by 0 days.

(21) Appl. No.: 19/182,175

(22) Filed: Apr. 17, 2025

(65) Prior Publication Data

US 2026/0160541 A1 Jun. 11, 2026

(30) Foreign Application Priority Data

Apr. 24, 2024 (KR) ........................ 10-2024-0054626

(51) Int. Cl.
*G01B 11/25* (2006.01)
*H04N 13/239* (2018.01)
*H04N 13/254* (2018.01)

(52) U.S. Cl.
CPC ...... *G01B 11/2518* (2013.01); *G01B 11/2545* (2013.01); *H04N 13/239* (2018.05); *H04N 13/254* (2018.05)

(58) Field of Classification Search
CPC ............ G01B 11/2518; G01B 11/2545; H04N 13/239; H04N 13/254
See application file for complete search history.

(56) References Cited

U.S. PATENT DOCUMENTS

2018/0124382 A1* 5/2018 Smith ........................ G06T 7/55
2024/0142225 A1* 5/2024 Ji ........................ G01B 11/2518

FOREIGN PATENT DOCUMENTS

JP 5485889 B2 5/2014
JP 7587460 B2 11/2024

* cited by examiner

*Primary Examiner* — John R Schnurr

(74) *Attorney, Agent, or Firm* — Bridgeway IP Law Group, PLLC; Jihun Kim

(57) ABSTRACT

A precision structured-light scanner that can provide a high resolution with a low cost is disclosed. One aspect of an embodiment provides a structured-light scanner that includes: a first projector configured to project a first light pattern onto a scanning target, where the first light pattern includes a first irradiated area and a first non-irradiated area; a second projector configured to project a second light pattern onto the scanning target, where the second light pattern includes a second irradiated area and a second non-irradiated area; and a camera unit configured to capture a shape of the scanning target in a common irradiated area or a common non-irradiated area, where the common irradiated area is an area of overlap between the first irradiated area and the second irradiated area, and the common non-irradiated area is an area of overlap between the first non-irradiated area and the second non-irradiated area.

8 Claims, 6 Drawing Sheets

PRECISION STRUCTURED-LIGHT SCANNER

CROSS-REFERENCE TO RELATED APPLICATIONS

This application claims the benefit of Korean Patent Application No. 10-2024-0054626, filed with the Korean Intellectual Property Office on Apr. 24, 2024, the disclosure of which is incorporated herein by reference in its entirety.

BACKGROUND

1. Technical Field

The present invention relates to a structured-light scanner, more particularly to a precision structured-light scanner that can provide a high resolution with a low cost.

2. Description of the Related Art

A structured-light scanner refers to a scanner that irradiates light of a particular pattern onto a scanning target and recognizes how the surface of the scanning target is shaped 3-dimensionally by analyzing how the light pattern is curved. The light pattern used for such structured-light 3D scanning typically includes a linear stripe for easy analysis and usually includes multiple stripes in order that the scanning may be performed quickly over a broad area.

Structured-light scanners may be divided into different types according to the manner in which the light is irradiated, where two major examples include structures that use laser interference and structures that use light projection. Since the use of lasers with constructive interference and destructive interference require relatively expensive optical systems and complicated control schemes, the light projection type is used as a desirable alternative.

FIG. 1 is a conceptual diagram illustrating the light pattern 1 projected by the projector of a typical structured-light scanner. The projector of a typical structured-light scanner, using a known light projection technique, can irradiate a black pattern onto a scanning target such that the light pattern 1 includes a multiple number of irradiated areas 5, which may take the form of bands lit in a particular color, and non-irradiated areas 7 in-between the irradiated areas 5 where the light is not irradiated.

Decreasing the width $w_1$ of the irradiated areas 5 and the width $w_n$ of the non-irradiated areas 7 in the light pattern 1 would allow the scanning of the target to be performed in smaller units and can therefore increase the precision of the scanning, but there is a limit to how much the widths of the irradiated areas 5 and non-irradiated areas 7 can be decreased. That is, decreasing the widths of the irradiated areas 5 and non-irradiated areas 7 are limited to the minimum pattern size that can be implemented by the equipment projecting the light pattern 1. In cases where a high resolution in the scale of micrometers is required, the projection of fine light patterns requires high-cost equipment. Thus, there is a need for a projection-based structured-light scanner that can provide a high resolution with inexpensive equipment.

SUMMARY OF THE INVENTION

An aspect of the present invention, which was conceived to resolve the problem described above, is to provide a precision structured-light scanner that can provide a high resolution with a low cost.

Other objectives of the invention will be more clearly understood from the embodiments set forth below.

One aspect of the invention provides a structured-light scanner that includes: a first projector configured to project a first light pattern onto a scanning target, where the first light pattern includes a first irradiated area in which light is irradiated and a first non-irradiated area in which light is not irradiated; a second projector configured to project a second light pattern onto the scanning target, where the second light pattern includes a second irradiated area in which light is irradiated and a second non-irradiated area in which light is not irradiated; and a camera unit configured to capture a shape of the scanning target in a common irradiated area or a common non-irradiated area, where the common irradiated area is an area of overlap between the first irradiated area and the second irradiated area, and the common non-irradiated area is an area of overlap between the first non-irradiated area and the second non-irradiated area.

A container according to an embodiment of the present invention can include one or more of the following features. For example, the first irradiated area and the second irradiated area can be irradiated in the form of elongated bands that extend along a first direction, where a band of the first irradiated area and a band of the second irradiated area can have equal widths.

The structured-light scanner can further include a pedestal configured to rotate the first projector and the second projector in relation to the scanning target such that the first light pattern and the second light pattern move along a surface of the scanning target. The pedestal can include a first pedestal for rotating the first projector and a second pedestal for rotating the second projector. In cases where the first irradiated area and the second irradiated area are irradiated in the form of elongated bands that extend along a first direction and the camera unit is configured to capture the common non-irradiated area, the first pedestal and the second pedestal can move the first projector and the second projector such that the first light pattern moves a distance greater than the width of the second irradiated area and smaller than a sum of the widths of the second irradiated area and the second non-irradiated area along a second direction orthogonal to the first direction on the surface of the scanning target before the second light pattern begins to move in the same direction at an equal speed. In cases where the first irradiated area and the second irradiated area are irradiated in the form of elongated bands that extend along a first direction and the camera unit is configured to capture the common irradiated area, the first pedestal and the second pedestal can move the first projector and the second projector such that the first light pattern moves a distance smaller than the width of the second irradiated area along a second direction orthogonal to the first direction on the surface of the scanning target before the second light pattern begins to move in the same direction at an equal speed.

In cases where the light reflected by the scanning target in the first irradiated area is reflected at a first intensity, the light reflected by the scanning target in the second irradiated area is reflected at a second intensity, and the light reflected by the scanning target in the common irradiated area is reflected at a third intensity, the camera unit can be configured to capture light having an intensity value higher than or equal to a predetermined threshold, where the first intensity and the second intensity can be lower than the threshold, and the third intensity can be higher than or equal to the threshold.

An embodiment of the present invention having the features above can provide various advantageous effects including the following. However, an embodiment of the present invention may not necessarily exhibit all of the effects below.

An embodiment of the invention makes it possible to provide an increased resolution, without increasing the resolution of the equipment used for projecting the light pattern itself, by using a unique method of controlling the light-projecting equipment. This in turn makes it possible to perform a precision scanning operation in a high resolution using inexpensive equipment.

DETAILED DESCRIPTION OF THE INVENTION

Figure 1:
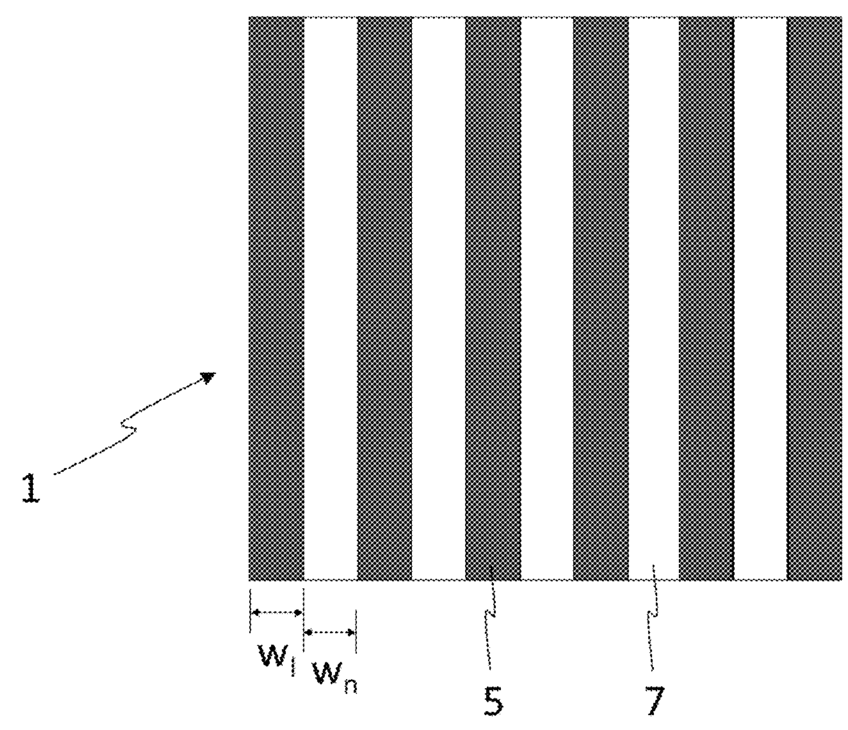
FIG. 1 is a conceptual diagram illustrating the light pattern projected by the projector of a typical structured-light scanner.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 2:
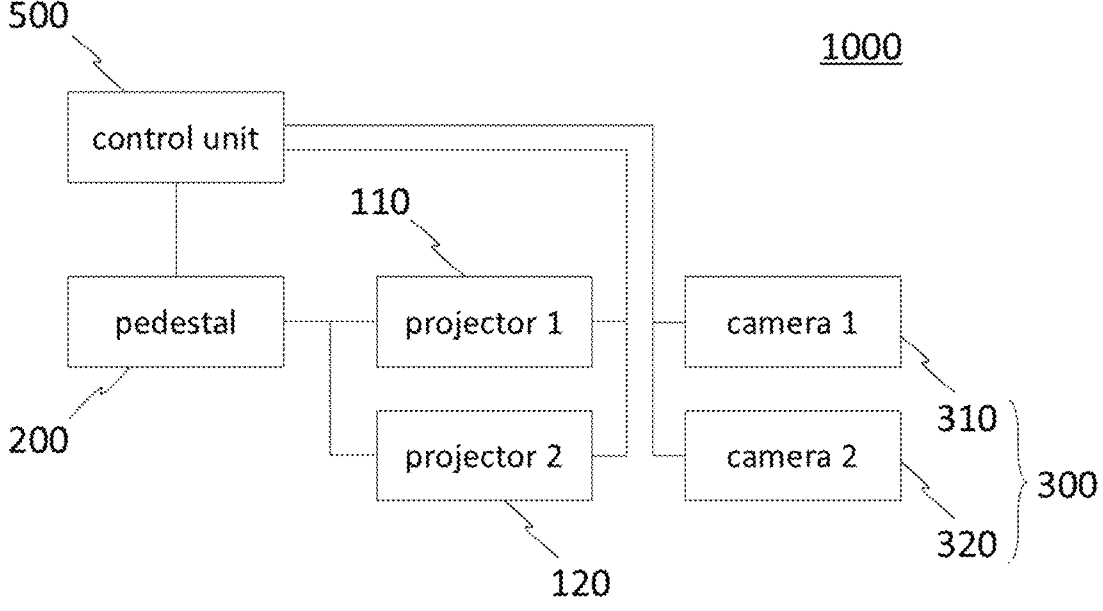
FIG. 2 is a block diagram illustrating a precision structured-light scanner according to an embodiment of the invention.
Figure 3:
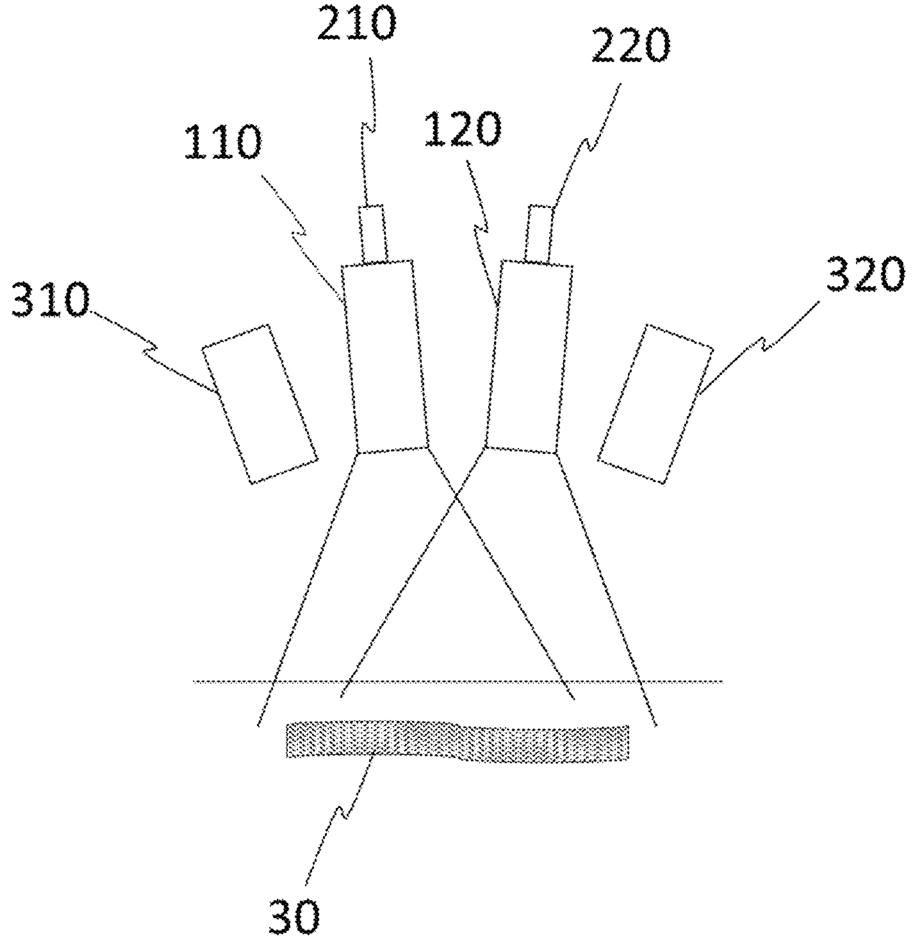
FIG. 3 is a conceptual diagram illustrating a precision structured-light scanner according to an embodiment of the invention.
Figure 4:
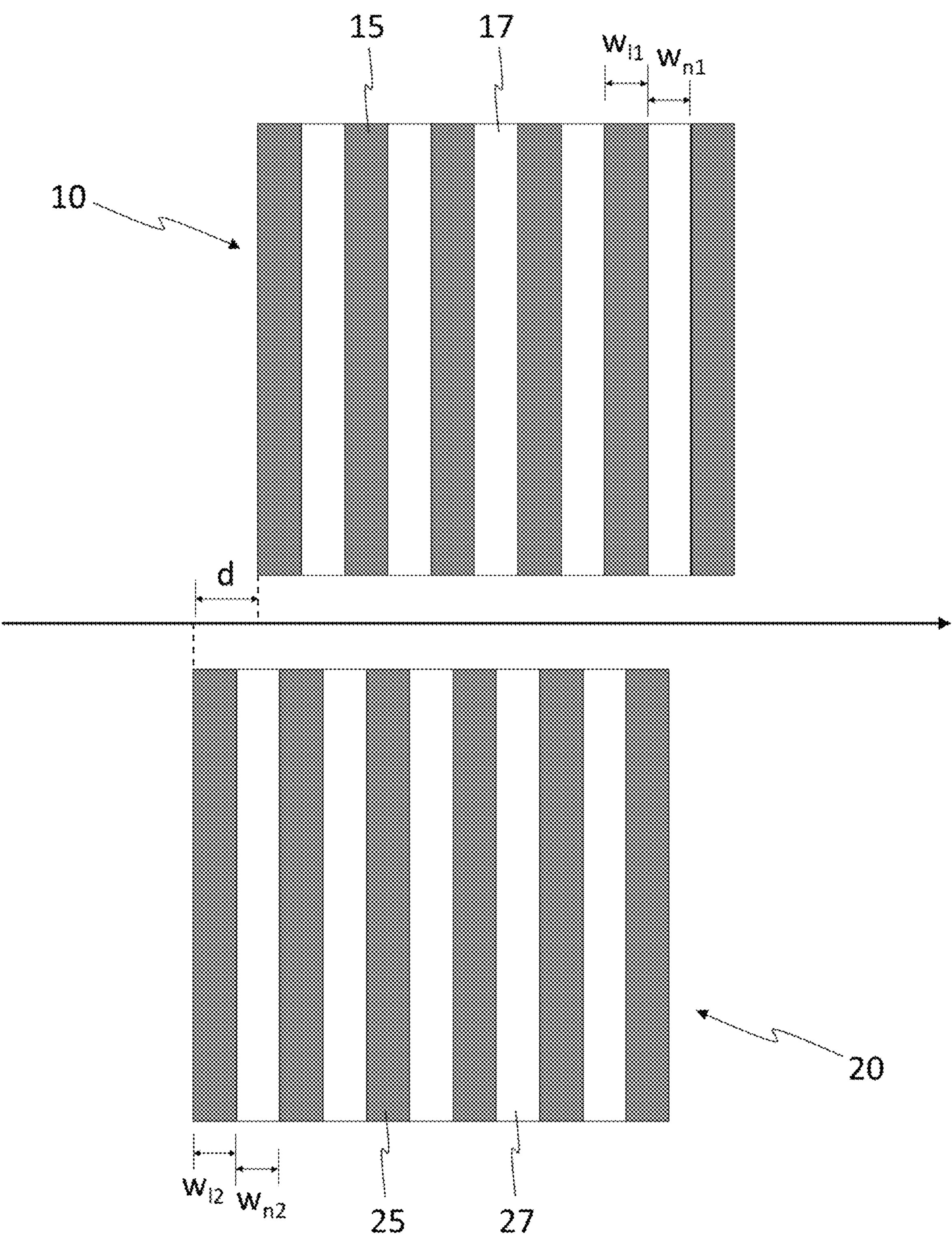
FIG. 4 is a conceptual diagram illustrating the light patterns projected by the first and second projectors of a precision structured-light scanner according to an embodiment of the invention.
Figure 5:
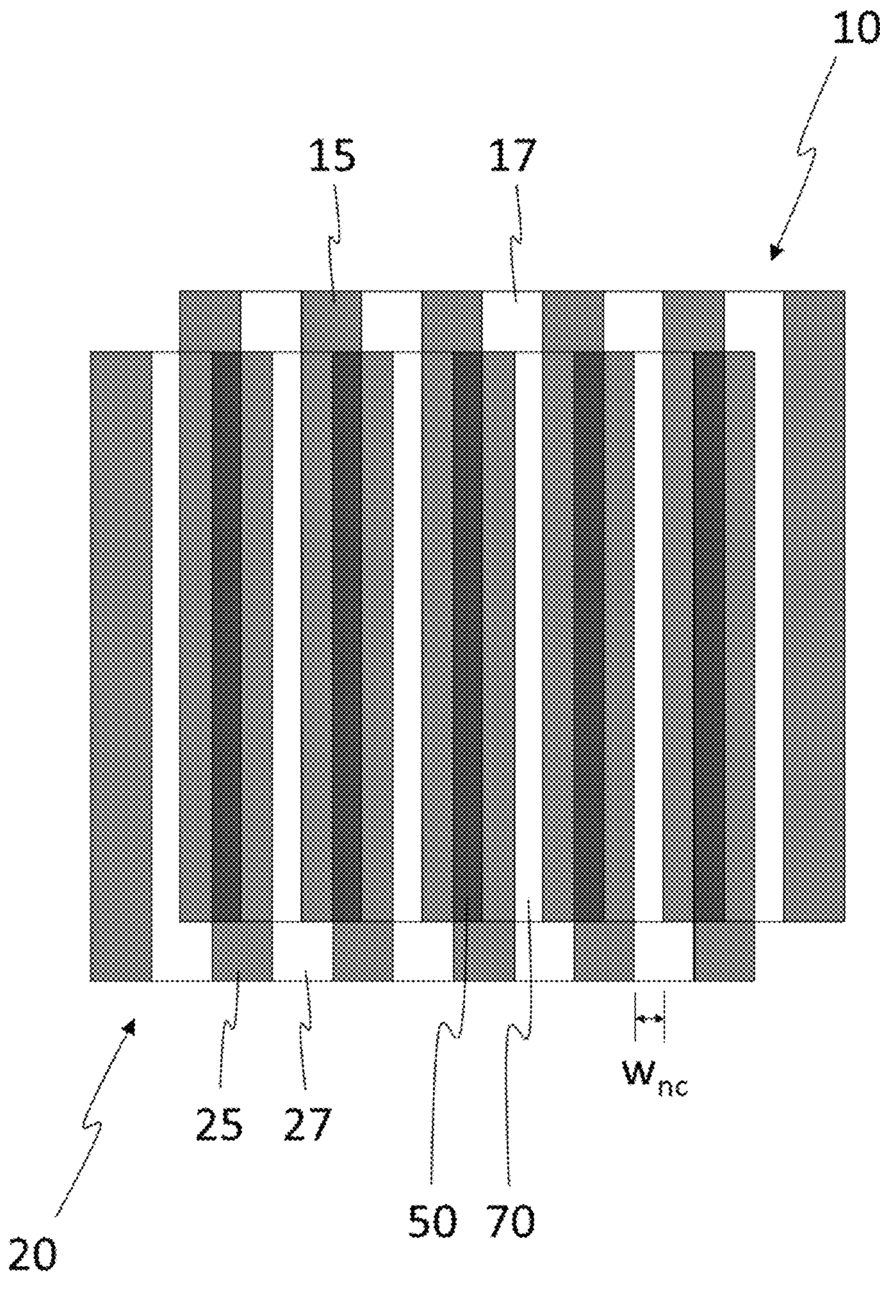
FIG. 5 is a conceptual diagram illustrating the light patterns projected by the first and second projectors of a precision structured-light scanner according to an embodiment of the invention.

FIG. 2 is a block diagram illustrating a structured-light scanner 1000 according to an embodiment of the invention, and FIG. 3 is a conceptual diagram illustrating a structured-light scanner 1000 according to an embodiment of the invention. FIG. 4 and FIG. 5 are conceptual diagrams illustrating the light patterns 10, 20 projected by the first and second projectors 110, 120 of the structured-light scanner 1000.

A precision structured-light scanner 1000 according to an embodiment of the invention may be configured to detect the 3-dimensional shape of the surface of a scanning target 30 by using a first light pattern 10 and a second light pattern 20 projected by a first projector 110 and a second projector 120, respectively. Referring to FIG. 2 and FIG. 3, the precision structured-light scanner 1000 can include a first projector 110, a second projector 120, a pedestal 200, a camera unit 300, and a control unit 500.

The first projector 110 may be configured to project a first light pattern 10 onto the scanning target 30. The first light pattern 10 projected by the first projector 110 can include a first irradiated area 15, where light is irradiated, and a first non-irradiated area 17, where light is not irradiated. While the first light pattern 10 can include multiple first irradiated areas 15 and multiple first non-irradiated areas 17, the invention is not limited thus, and it is possible to have the first projector 110 project just one first irradiated area 15.

In the first light pattern 10, the first irradiated areas 15 and first non-irradiated areas 17 can all have the form of elongated bands that extend along a first direction (the longitudinal direction in FIG. 4). However, the invention is not limited thus, and it is possible to have the first projector 110 implement the first irradiated area 15 and first non-irradiated area 17 in forms other than bands.

In an embodiment of the invention, the multiple first irradiated areas 15 included in the first light pattern 10 can have the same width $w_{11}$, and the multiple first non-irradiated areas 17 included in the first light pattern 10 can have the same width $w_{n1}$. In certain embodiments, the width $w_{11}$ of the first irradiated areas 15 and the width $w_{n1}$ of the first non-irradiated areas 17 can be equal.

The second projector 120 may be configured to project a second light pattern 20 onto the scanning target 30. The second light pattern 20 projected by the second projector 120 can include a second irradiated area 25, where light is irradiated, and a second non-irradiated area 27, where light is not irradiated. While the second light pattern 20 can include multiple second irradiated areas 25 and multiple second non-irradiated areas 27, the invention is not limited thus, and it is possible to have the second projector 120 project just one second irradiated area 25.

In the second light pattern 20, the second irradiated areas 25 and second non-irradiated areas 27 can all have the form of elongated bands that extend along the first direction (the longitudinal direction in FIG. 4). However, the invention is not limited thus, and it is possible to have the second projector 120 implement the second irradiated area 25 and second non-irradiated area 27 in forms other than bands.

In an embodiment of the invention, the multiple second irradiated areas 25 included in the second light pattern 20 can have the same width $w_{12}$, and the multiple second non-irradiated areas 27 included in the second light pattern 20 can have the same width $w_{n2}$. In certain embodiments, the width $w_{12}$ of the second irradiated areas 25 and the width $w_{n2}$ of the second non-irradiated areas 27 can be equal. Furthermore, in an embodiment of the invention, the width $w_{11}$ of the first irradiated areas 15 and the width $w_{n1}$ of the first non-irradiated areas 17 in the first light pattern 10 can be the same as the width $w_{12}$ of the second irradiated areas 25 and the width $w_{n2}$ of the second non-irradiated areas 27 in the second light pattern 20. Such a structure allows the first projector 110 and the second projector 120 to have identical or similar specifications and/or structures, so that the structured-light scanner 1000 may have a simpler structure and costs may be further reduced.

The pedestal 200 can be configured to rotate the first projector 110 and the second projector 120 in relation to the scanning target 30. Reference to the pedestal 200 rotating the first projector 110 and second projector 120 in relation to the scanning target 30 in the present specification means that the pedestal 200 applies at least one of a revolving action and a translationally moving action to the first projector 110 and second projector 120. Since the pedestal 200 rotates the first projector 110 and the second projector 120 in relation to the scanning target 30, it is possible to have the pedestal 200 rotate the scanning target 30 while the first and second projectors 110, 120 are in an affixed state. In certain embodiments of the invention, the pedestal 200 can include a first pedestal 210 for rotating the first projector 110 and a second pedestal 220 for rotating the second projector 120.

The camera unit 300 is the part that analyzes the surface of the scanning target 30 onto which the first light pattern 10 and second light pattern 20 are projected. For example, in certain embodiments of the invention, the camera unit 300 can capture the common irradiated area 50, which is an area where a first irradiated area 15 of the first light pattern 10 and a second irradiated area 25 of the second light pattern 20 overlap. In certain embodiments of the invention, the camera unit 300 can capture the common non-irradiated area 70, which is an area where a first non-irradiated area 17 of the first light pattern 10 and a second non-irradiated area 27 of the second light pattern 20 overlap. The captured image can be transmitted to an image processing unit (not shown) to be used as data for analyzing the shape formed by the surface of the scanning target 30 in 3-dimensional space.

For a more accurate analysis, the camera unit 300 can include a first camera 310 and a second camera 320. If the camera unit 300 thus includes a multiple number of cameras 310, 320, data on a portion of the scanning target 30 that is hidden from the viewpoint of one camera can be supplemented by the data from another camera in cases where there are many concaves and convexes in the surface of the scanning target 30. Of course, in certain embodiments, it is possible for the camera unit 300 to include just one camera.

The control unit 500 can control the overall operation of the precision structured-light scanner 1000. The control unit 500 can, for example, control the operations of the first and second projectors 110, 120, the pedestal 200, and the camera unit 300 and can also control the operation of the image processing unit (not shown) that analyzes the images captured by the camera unit 300.

The following provides a detailed description, with reference to FIG. 4 and FIG. 5, of the operating principles of a precision structured-light scanner 1000 according to an embodiment of the invention.

According to an embodiment of the invention, when the structured-light scanner 1000 is operated, the first and second projectors 110, 120 can project the first and second light patterns 10, 20, respectively, where the first and second irradiated areas 15, 25 in the first and second light patterns 10, 20 can be irradiated in the form of elongated bands that extend along a first direction. Here, the first and second projectors 110, 120 can irradiate light corresponding to black patterns such that the first and second irradiated areas 15, 25 have a particular color. The widths $w_{11}$, $w_{12}$ of the irradiated areas 15, 25 and the widths $w_{n1}$, $w_{n2}$ of the non-irradiated areas 17, 27 included in the first and second light patterns 10, 20 can be, for example, 5 μm.

According to an embodiment of the invention, the pedestal 200 can include a first pedestal 210 that rotates the first projector 110 and a second pedestal 220 that rotates the second projector 120. The first pedestal 210 can rotate the first projector 110 in relation to the scanning target 30 at a preconfigured speed, and as a result, the first light pattern 10 projected by the first projector 110 can move along a second direction (the lateral direction in FIG. 4; marked by an arrow) that is orthogonal to the first direction (the direction in which the bands of the first irradiated areas 15 and first non-irradiated areas 17 extend; the longitudinal direction in FIG. 4).

After the first light pattern 10 moves a particular distance d, the second pedestal 220 can rotate the second projector 120 in relation to the scanning target 30. The second pedestal 220 can rotate the second projector 120 at a speed equal to that of the first pedestal 210, and the second light pattern 20 projected by the second projector 120 can move along the second direction at a position trailing the first light pattern 10 by the distance d.

The distance d by which the second light pattern 20 falls behind can be a value that is greater than the width $w_{12}$ of the second irradiated area 25 but smaller than the sum ($w_{12}$+$w_{n2}$) of the width $w_{12}$ of the second irradiated area 25 and width $w_{n2}$ of the second non-irradiated area 27, as depicted in FIG. 4. In cases where the width $w_{12}$ of the second irradiated area 25 and the width $w_{n2}$ of the second non-irradiated area 27 are both 5 μm, the distance d by which the second light pattern 20 falls behind can be, for example, 7.5 μm.

As the first and second pedestals 210, 220 rotate as above such that the first light pattern 10 and second light pattern 20 move with a difference of a particular distance d, the first light pattern 10 and the second light pattern 20 may partially overlap on the scanning target 30. FIG. 5 is a conceptual representation of how the first light pattern 10 and the second light pattern 20 may overlap. FIG. 5 depicts the patterns in a manner intended to aid understanding; in actual operation, the first light pattern 10 and the second light pattern 20 do not need to be staggered along the longitudinal direction.

Referring to FIG. 5, the first light pattern 10 projected by the first projector 110 and the second light pattern 20 projected by the second projector 120 may overlap on the surface of the scanning target 30 facing the first and second projectors 110, 120, so that common irradiated areas 50, which are where the first irradiated areas 15 and second irradiated areas 25 overlap, and common non-irradiated areas 70, which are where the first non-irradiated areas 17 and second non-irradiated areas 27 overlap, may be formed on the surface of the scanning target 30. Naturally, the width $w_{nc}$ of a common non-irradiated area 70 would be smaller than the widths $w_{11}$, $w_{12}$ of the irradiated areas 15, 25 and the widths $w_{n1}$, $w_{n2}$ of the non-irradiated areas 17, 27. In cases where the widths $w_{n}$, $w_{12}$ of the irradiated areas 15, 25 and the widths $w_{n1}$, $w_{n2}$ of the non-irradiated areas 17, 27 are 5 μm and the distance d by which the second light pattern 20 falls behind is 7.5 μm as in the examples give above, the width $w_{nc}$ of the common non-irradiated area 70 would be 2.5 μm.

The camera unit 300 can capture the shape of the scanning target 30 in the common non-irradiated areas 70, which are the portions where the black patterns of the first and second projectors 110, 120 are not irradiated. The captured image can be transmitted to a separate image processing unit (not shown) to be used as data for analyzing the shape formed by the surface of the scanning target 30 in 3-dimensional space.

Since the width of the common non-irradiated areas 70 is smaller than the widths of the non-irradiated areas 17, 27 included in the first and second light patterns 10, 20, a higher resolution can be obtained compared to cases where the first and second projectors 110, 120 are used individually. That is, if high-end equipment capable of providing higher resolutions were to be used for the projectors 110, 120, then this would cause a significant increase in costs. An embodiment of the invention, however, employs an approach which, instead of increasing the resolution of the equipment itself, utilizes a method of controlling the projectors 110, 120 to perform a scanning operation in a resolution that is considerably higher. In particular, in an embodiment of the invention, the control unit 500 of the structured-light scanner 1000 can also adjust the operation of the second pedestal 220 as necessary to modify the distance d by which the second light pattern 20 falls behind. This means that the width $w_{nc}$ of the common non-irradiated areas 70 can be decreased even further and that the resolution can be increased to more than double the resolution obtainable with the first and second projectors 110, 120 individually.

Although the above descriptions refer to the pedestal 200 being separated into a first pedestal 210 and a second pedestal 220, providing a particular distance d between the first light pattern 10 and the second light pattern 20 does not necessarily have to be performed by first and second pedestals 210, 220 that rotate the first and second projectors 110, 120 individually.

For example, in an embodiment of the invention, the pedestal 200 can be configured to rotate the first projector 110 and the second projector 120 together, where the first projector 110 and the second projector 120 can be affixed to the pedestal 200 but arranged such that the first light pattern 10 and second light pattern 20 are projected with a distance d in-between. In such cases, the pedestal 200 can be configured to rotate the scanning target 30 instead of rotating the projectors 110, 120.

Figure 6:
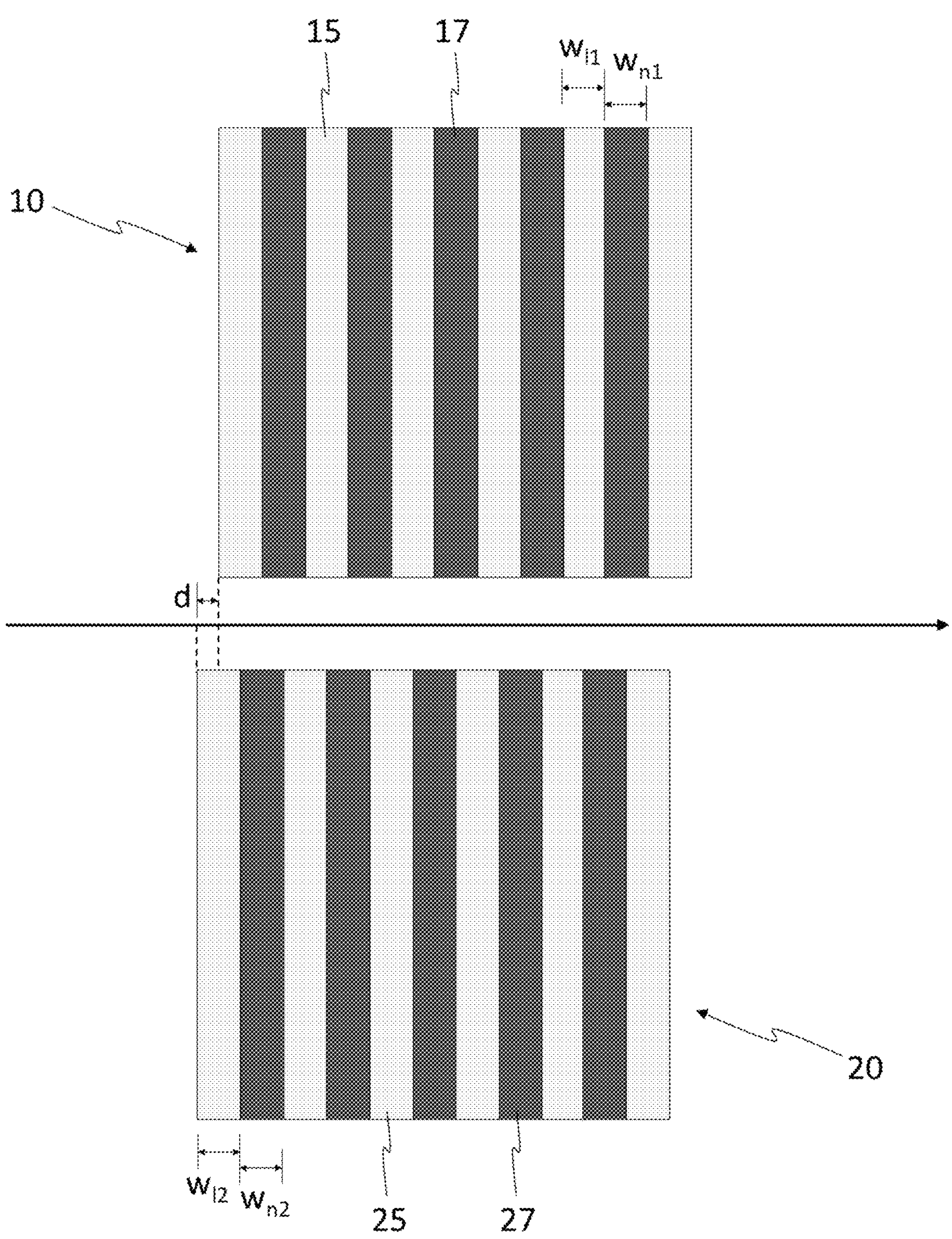
FIG. 6 is a conceptual diagram illustrating the light patterns projected by the first and second projectors of a precision structured-light scanner according to another embodiment of the invention.
Figure 7:
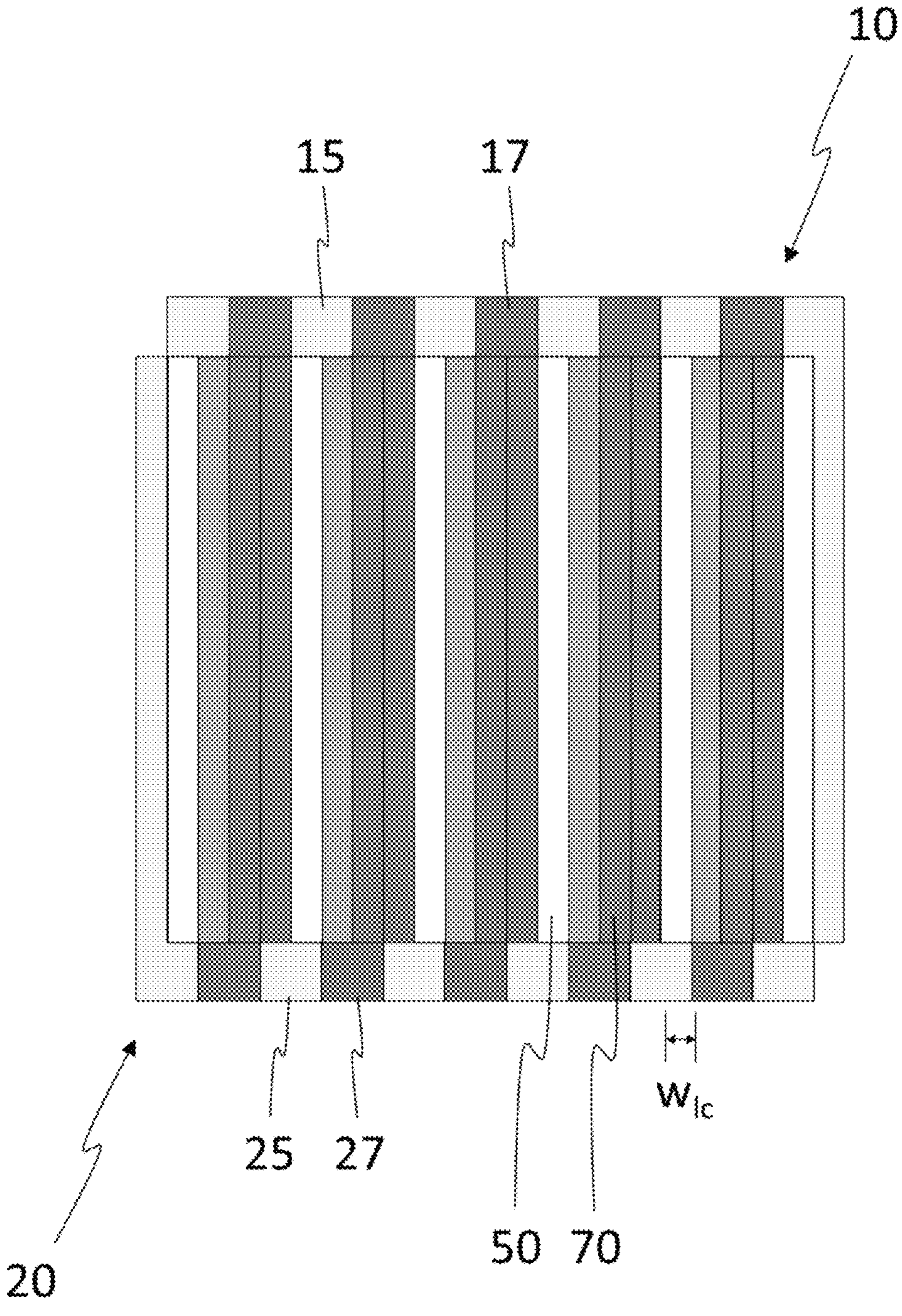
FIG. 7 is a conceptual diagram illustrating the light patterns projected by the first and second projectors of a precision structured-light scanner according to another embodiment of the invention.

The following provides a detailed description, with reference to FIG. 6 and FIG. 7, of the operating principles of a precision structured-light scanner 1000 according to another embodiment of the invention. FIG. 6 and FIG. 7 are conceptual diagrams illustrating the light patterns 10, 20 projected by the first and second projectors 110, 120 of a precision structured-light scanner 1000 according to another embodiment of the invention.

According to an embodiment of the invention, when the structured-light scanner 1000 is operated, the first and second projectors 110, 120 can project the first and second light patterns 10, 20, respectively, where the first and second irradiated areas 15, 25 in the first and second light patterns 10, 20 can be irradiated in the form of elongated bands that extend along a first direction. Here, the first and second projectors 110, 120 can irradiate light corresponding in particular intensities to form the first and second irradiated areas 15, 25 on the surface of the scanning target 30. The first and second projectors 110, 120 can be configured such that the light reflected by the scanning target 30 in the first irradiated areas 15 of the first light pattern 10 is reflected at a first intensity and the light reflected by the scanning target 30 in the second irradiated areas 25 of the second light pattern 20 is reflected at a second intensity. The widths $w_{11}$, $w_{12}$ of the irradiated areas 15, 25 and the widths $w_{n1}$, $w_{n2}$ of the non-irradiated areas 17, 27 included in the first and second light patterns 10, 20 can be, for example, 5 μm.

According to an embodiment of the invention, the pedestal 200 can include a first pedestal 210 that rotates the first projector 110 and a second pedestal 220 that rotates the second projector 120. The first pedestal 210 can rotate the first projector 110 in relation to the scanning target 30 at a preconfigured speed, and as a result, the first light pattern 10 projected by the first projector 110 can move along a second direction (the lateral direction in FIG. 6; marked by an arrow) that is orthogonal to the first direction (the direction in which the bands of the first irradiated areas 15 and first non-irradiated areas 17 extend; the longitudinal direction in FIG. 6).

After the first light pattern 10 moves a particular distance d, the second pedestal 220 can rotate the second projector 120 in relation to the scanning target 30. The second pedestal 220 can rotate the second projector 120 at a speed equal to that of the first pedestal 210, and the second light pattern 20 projected by the second projector 120 can move along the second direction at a position trailing the first light pattern 10 by the distance d.

The distance d by which the second light pattern 20 falls behind can be a value that is smaller than the width $w_{12}$ of the second irradiated area 25, as depicted in FIG. 6. In cases where the width $w_{12}$ of the second irradiated area 25 is 5 μm, the distance d by which the second light pattern 20 falls behind can be, for example, 2.5 μm.

As the first and second pedestals 210, 220 rotate as above such that the first light pattern 10 and second light pattern 20 move with a difference of a particular distance d, the first light pattern 10 and the second light pattern 20 may partially overlap on the scanning target 30. FIG. 7 is a conceptual representation of how the first light pattern 10 and the second light pattern 20 may overlap. FIG. 7 depicts the patterns in a manner intended to aid understanding; in actual operation, the first light pattern 10 and the second light pattern 20 do not need to be staggered along the longitudinal direction.

Referring to FIG. 7, the first light pattern 10 projected by the first projector 110 and the second light pattern 20 projected by the second projector 120 may overlap on the surface of the scanning target 30 facing the first and second projectors 110, 120, so that common irradiated areas 50, which are where the first irradiated areas 15 and second irradiated areas 25 overlap, may be formed on the surface of the scanning target 30. Naturally, the width $w_{1c}$ of a common irradiated area 50 would be smaller than the widths $w_{11}$, $w_{12}$ of the irradiated areas 15, 25. In cases where the widths $w_{11}$, $w_{12}$ of the irradiated areas 15, 25 are 5 μm and the distance d by which the second light pattern 20 falls behind is 2.5 μm as in the examples given above, the width $w_{1c}$ of the common irradiated area 50 would be 2.5 μm.

Since the first and second projectors 110, 120 project light at particular intensities, a third intensity representing the intensity of light reflected by the scanning target 30 in the common irradiated areas 50 is higher than the first intensity, which is the intensity of the light reflected in the first irradiated areas 15 of the first light pattern 10 only, and the second intensity, which is the intensity of the light reflected in the second irradiated areas 25 of the second light pattern 20 only.

The camera unit 300 of a precision structured-light scanner 1000 according to an embodiment of the invention can be configured to capture light having an intensity value higher than or equal to a predetermined threshold. Here, reference to the camera unit 300 capturing light having an intensity value higher than or equal to a threshold encompasses not only cases in which the camera unit 300 itself only captures light having intensity values higher than or equal to the threshold but also cases in which the camera unit obtains both light having intensity values higher than or equal to the threshold and light having intensity values lower than the threshold but is able to differentiate data that corresponds to the light having intensity values higher than or equal to the threshold from among the collectively collected data. Once the data obtained by the camera unit 300 is transmitted to the image processing unit (not shown), the image processing unit can analyze the image corresponding to the common irradiated areas 50 having a width of 2.5 μm to identify the shape of the scanning target 30.

As set forth above, certain embodiments of the invention make it possible to provide an increased resolution by using a method of controlling the equipment for projecting light patterns instead of having to increase the resolution of the equipment itself. Thus, according to such embodiments of the invention, scanning operations can be performed with inexpensive equipment to yield high resolutions.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A structured-light scanner, comprising:

a first projector configured to project a first light pattern onto a scanning target, the first light pattern including a first irradiated area where light is irradiated and a first non-irradiated area where light is not irradiated, the first light pattern being irradiated such that the first irradiated area and the first non-irradiated area form elongated bands extending along a first direction;

a second projector configured to project a second light pattern onto the scanning target, the second light pattern including a second irradiated area where light is irradiated and a second non-irradiated area where light is not irradiated, the second light pattern being irradiated such that the second irradiated area and the second non-irradiated area form elongated bands extending along the first direction and such that a portion of the second irradiated area overlaps a portion of the first irradiated area and a portion of the second non-irradiated area overlaps a portion of the first non-irradiated area on a surface of the scanning target; and a camera unit configured to capture a shape of the scanning target in a common irradiated area or a common non-irradiated area, the common irradiated area being an area of overlap between the first irradiated area and the second irradiated area and having a width smaller than a width of the first irradiated area and a width of the second irradiated area, the common non-irradiated area being an area of overlap between the first non-irradiated area and the second non-irradiated area and having a width smaller than a width of the first non-irradiated area and a width of the second non-irradiated area, wherein light reflected by the scanning target in the first irradiated area is reflected at a first intensity, light reflected by the scanning target in the second irradiated area is reflected at a second intensity, and light reflected by the scanning target in the common irradiated area is reflected at a third intensity, and wherein the camera unit is configured to capture light having an intensity value higher than or equal to a predetermined threshold, the first intensity and the second intensity are lower than the predetermined threshold, and the third intensity is higher than or equal to the predetermined threshold.

2. The structured-light scanner of claim 1, wherein a band of the first irradiated area and a band of the second irradiated area have equal widths.

3. The structured-light scanner of claim 1, further comprising:

a pedestal configured to rotate the first projector and the second projector in relation to the scanning target such that the first light pattern and the second light pattern move along the surface of the scanning target.

4. The structured-light scanner of claim 3, wherein the pedestal comprises a first pedestal and a second pedestal, the first pedestal being configured to rotate the first projector, and the second pedestal being configured to rotate the second projector.

5. The structured-light scanner of claim 4, wherein the camera unit captures the common non-irradiated area, and the first pedestal and the second pedestal move the first projector and the second projector such that the first light pattern moves a distance greater than the width of the second irradiated area and smaller than a sum of the widths of the second irradiated area and the second non-irradiated area along a second direction orthogonal to the first direction on the surface of the scanning target before the second light pattern begins to move in a same direction at an equal speed.

6. The structured-light scanner of claim 4, wherein the camera unit captures the common irradiated area, and the first pedestal and the second pedestal move the first projector and the second projector such that the first light pattern moves a distance smaller than the width of the second irradiated area along a second direction orthogonal to the first direction on the surface of the scanning target before the second light pattern begins to move in a same direction at an equal speed.

7. A structured-light scanner, comprising:

a first projector configured to project a first light pattern onto a scanning target, the first light pattern including a first irradiated area where light is irradiated and a first non-irradiated area where light is not irradiated, the first light pattern being irradiated such that the first irradiated area and the first non-irradiated area form elongated bands extending along a first direction;

a second projector configured to project a second light pattern onto the scanning target, the second light pattern including a second irradiated area where light is irradiated and a second non-irradiated area where light is not irradiated, the second light pattern being irradiated such that the second irradiated area and the second non-irradiated area form elongated bands extending along the first direction and such that a portion of the second irradiated area overlaps a portion of the first irradiated area and a portion of the second non-irradiated area overlaps a portion of the first non-irradiated area on a surface of the scanning target;

a camera unit configured to capture a shape of the scanning target in a common irradiated area or a common non-irradiated area, the common irradiated area being an area of overlap between the first irradiated area and the second irradiated area and having a width smaller than a width of the first irradiated area and a width of the second irradiated area, the common non-irradiated area being an area of overlap between the first non-irradiated area and the second non-irradiated area and having a width smaller than a width of the first non-irradiated area and a width of the second non-irradiated area; and a pedestal configured to rotate the first projector and the second projector in relation to the scanning target such that the first light pattern and the second light pattern move along the surface of the scanning target, wherein the pedestal comprises a first pedestal and a second pedestal, the first pedestal being configured to rotate the first projector, and the second pedestal being configured to rotate the second projector, wherein the camera unit captures the common non-irradiated area, and wherein the first pedestal and the second pedestal move the first projector and the second projector such that the first light pattern moves a distance greater than the width of the second irradiated area and smaller than a sum of the widths of the second irradiated area and the second non-irradiated area along a second direction orthogonal to the first direction on the surface of the scanning target before the second light pattern begins to move in a same direction at an equal speed.

8. A structured-light scanner, comprising:

a first projector configured to project a first light pattern onto a scanning target, the first light pattern including a first irradiated area where light is irradiated and a first non-irradiated area where light is not irradiated, the first light pattern being irradiated such that the first irradiated area and the first non-irradiated area form elongated bands extending along a first direction;

a second projector configured to project a second light pattern onto the scanning target, the second light pattern including a second irradiated area where light is irradiated and a second non-irradiated area where light is not irradiated, the second light pattern being irradiated such that the second irradiated area and the second non-irradiated area form elongated bands extending along the first direction and such that a portion of the second irradiated area overlaps a portion of the first irradiated area and a portion of the second non-irradiated area overlaps a portion of the first non-irradiated area on a surface of the scanning target;

a camera unit configured to capture a shape of the scanning target in a common irradiated area or a common non-irradiated area, the common irradiated area being an area of overlap between the first irradiated area and the second irradiated area and having a width smaller than a width of the first irradiated area and a width of the second irradiated area, the common non-irradiated area being an area of overlap between the first non-irradiated area and the second non-irradiated area and having a width smaller than a width of the first non-irradiated area and a width of the second non-irradiated area; and a pedestal configured to rotate the first projector and the second projector in relation to the scanning target such that the first light pattern and the second light pattern move along the surface of the scanning target, wherein the pedestal comprises a first pedestal and a second pedestal, the first pedestal being configured to rotate the first projector, and the second pedestal being configured to rotate the second projector, wherein the camera unit captures the common irradiated area, and wherein the first pedestal and the second pedestal move the first projector and the second projector such that the first light pattern moves a distance smaller than the width of the second irradiated area along a second direction orthogonal to the first direction on the surface of the scanning target before the second light pattern begins to move in a same direction at an equal speed.

* * * * *